United States Patent [19]

Check et al.

[11] Patent Number: 4,970,852
[45] Date of Patent: Nov. 20, 1990

[54] GRASS CATCHER FOR REEL MOWER

[75] Inventors: Joseph M. Check, Shoreview; Donald B. Schnotala, Burnsville; Michael G. Roy, Mound, all of Minn.

[73] Assignee: The Toro Company, Minneapolis, Minn.

[21] Appl. No.: 308,902

[22] Filed: Feb. 9, 1989

[51] Int. Cl.$^5$ .............................................. A01D 34/48
[52] U.S. Cl. ...................................... 56/199; 56/201; 56/202
[58] Field of Search ................ 56/194, 198, 199, 200, 56/202–206, 14.3, 201

[56] References Cited

U.S. PATENT DOCUMENTS

| | | | |
|---|---|---|---|
| 1,484,084 | 2/1924 | Rohrbach | 56/199 |
| 2,361,637 | 10/1944 | Lathrop | 56/199 |
| 3,408,801 | 11/1968 | Kroll | 56/199 |
| 3,521,436 | 7/1970 | Venzke | 56/199 |
| 3,875,729 | 4/1975 | Partsch | 56/199 |
| 4,080,774 | 3/1978 | Knight | 56/199 |
| 4,087,955 | 5/1978 | Szymanis | 56/202 |
| 4,191,007 | 3/1980 | Check et al. | 56/199 |
| 4,745,735 | 5/1988 | Katayama | 56/202 |

*Primary Examiner*—Jerome W. Massie, IV
*Assistant Examiner*—Matthew Smith
*Attorney, Agent, or Firm*—R. Lawrence Buckley

[57] ABSTRACT

A grass catcher (40) for a reel mower (10). Catcher (40) includes a vent (94) which is offset relative to the longitudinal axis (55) of the catcher (40). Catcher (40) also preferably includes a panel (78a) which prevents air and grass from escaping catcher (40) on the side of catcher (40) favored by spiral blades (27) of rotating cutting reel (26). Vent (94) is preferably formed by a pair of partitions (96 and 100) which intercept the flow of air and grass and serve to dissipate the kinetic energy of the air to the point where the grass is separated out and falls to the bottom of catcher (40). A pair of slots (108 and 110) permit the egress of air from within catcher (40).

24 Claims, 4 Drawing Sheets

GRASS CATCHER FOR REEL MOWER

FIELD OF THE INVENTION

The invention relates generally to reel mowers, and more particularly to reel mower grass catchers.

BACKGROUND OF THE INVENTION

Many types of turf mowing equipment are known. Such equipment can be classified into those mowers which include one or more rotary cutting units and those which include one or more reel cutting units. A rotary cutting unit usually includes one or more rigid steel blades rotated within a housing in horizontal cutting planes to sever grass or other vegetation at a predetermined height above the ground. Turf mowers having rotary cutting units are often referred to as rotary mowers since the blades revolve in a rotary fashion within the cutting unit.

A reel cutting unit on the other hand typically includes a frame within which is horizontally rotatably mounted a reel possessing a plurality of helical blades. The rotating reel blades pass in close proximity to a bedknife which spans the cutting unit frame parallel to the reel axis. Grass blades are sheared at the reel blade/bedknife interface.

While rotary cutting units are generally suitable for most purposes, it is generally perceived that reel units provide a higher quality, more precise cut. Since the present invention pertains to reel mowers, the remainder of this discussion will be so directed.

During use of a reel mower, it is often thought desirable to catch the grass clippings, particularly when mowing golf greens using a greensmower. Conventional wisdom is that grass clippings should be caught to protect the green from fungus growth and thatch buildup and to enhance the uniformity and speed of the green. Greens can be raked, aerated and/or verticut to eliminate thatch but it is unquestionably more economical to prevent the formation of thatch in the first instance, by not allowing clippings to accumulate on the green.

The present invention pertains to reel mower grass catchers generally. The invention will be described primarily in terms of a greensmower catcher, but those skilled in the art will recognize that the reel mower grass catcher of the present invention could be applied to reel mowers other than greensmowers.

Various types of reel mower grass catchers have been tried in the past with varying success. Certainly the simplest reel mower grass catcher is an open basket having a bottom wall, side walls and a rear wall, but being completely open at the top and front (assuming a rear mounting configuration). U.S. Pat. No. 1,484,084, issued to F. L. Rohrbach, and U.S. Pat. No. 3,875,729, issued to T. J. Partsch, are examples of this very basic type of reel mower grass catcher.

Open catchers. e.g., Rohrbach and Partsch work quite well in conjunction with mowers having low speed reels, typically manually propelled units. In fact, open baskets have traditionally been associated with walk-behind, manually-propelled, unpowered moWers, to which they are normally rear mounted The reels of such mowers, being geared to the wheels in most cases rotate at a relatively low speed and do not "pump" a large quantity of air/grass into the catcher. The grass is rather gently propelled off of the bedknife and into the catcher.

On the other hand, open catchers don't work particularly well with mowers having higher speed, typically powered reels. High speed reels, all things being equal can produce very small clippings, perhaps down to 0.03 inch long, depending on a variety of factors. Higher speed reels also pump a significant quantity of air. Thus open catchers are generally unsuitable for powered reels because the high air flows tend to carry the small clippings out of the confines of the basket.

In part because of the problems associated with open catchers described above, completely closed catchers developed. An example of this type of catcher is shown in U.S. Pat. No. 3,408 801, issued to H. E. Kroll. This type of catcher has solid front, bottom, side and top walls which combine to form something akin to a five-sided shoe box with one missing end wall (the rear wall for a front mounted catcher like that shown in Kroll) which forms a mouth for accepting the air/grass stream issuing off of the reel. Although at first glance this may seem to be an acceptable solution to the problems associated with open catchers, given the fact that the top of a closed catcher is indeed closed the primary problem with completely closed catchers is that they do not sufficiently allow for the egress of air being pumped by a high speed rotating reel. A high speed reel is in some sense like a centrifugal air pump with the spiral blades functioning like the vanes of the pump. Not only does a high speed reel cut grass and propel the clippings toward the catcher it also pumps a considerable amount of air. The only way for the pumped air to escape a completely closed catcher is back through the inlet or mouth of the catcher. This backflow interferes with the forward flow into the catcher, entrains a significant percentage of the clippings that should have ended up in the catcher and deposits them onto the surface being mowed. As noted above if clippings are allowed to accumulate on the green, fungus growth and thatch build-up may result Also closed catchers are not configured to accommodate the angular manner in which the air/grass mixture comes off a reel. The spiral blades of a reel tend to throw the grass at a lateral angle away from the path of travel of the mower. Thus, even if a closed catcher is designed to capture most of the grass thrown laterally off of the reel, the grass which does land in the catcher tends to collect in one side and is not evenly distributed across the width of the catcher. This necessitates more frequent emptying of the catcher, and in extreme cases can actually detrimentally affect the quality of cut. Interestingly enough, the non-uniform filling problem occasioned by the spiral blades has been addressed by open catcher designs but apparently not by closed catcher designs. The Rohrbach and Partsch references, discussed above disclose, open catchers having mechanical means for taking that phenomenon into account to attempt to achieve a fairly uniform distribution of grass within the grass catcher. Rohrbach, for example, includes a catcher which is not mounted directly behind the bedknife but instead is asymmetrical with respect to the longitudinal centerline of the mower The sides of the catcher extend rearwardly at a lateral angle to the path of travel of the mower so as to be more accurately aligned in the path of travel of the severed grass clippings. Thus the operator does not have to frequently stop to manually even up the distribution of the cut grass over the bottom of the catcher. One problem with the Rohrbach approach, however, is that the increased width of the catcher makes it somewhat impractical to use along borders or fencelines. The Partsch reference teaches the use of a guide attachment mounted directly behind the bedknife. The guide attachment includes vanes which supposedly counter or intercept the lateral flow of clippings and help to arrange the clippings uniformly over the entire bottom of the grass catcher. Again, Rohrbach and Partsch disclose open catchers, and their suggested solutions to the lateral grass throwing problem discussed immediately above have not been applied, apparently, to closed catchers.

To allow the incoming air to escape from a closed catcher, while at the same time retaining the grass clippings within the catcher, attempts have been made to add screens or meshes to the otherwise solid walls of the closed grass catcher. An example of this type of grass catcher has been offered by The Toro Company assignee herein for use with the Toro Series 4 greensmower. In theory, such a screened catcher is perfectly adequate, for the air pumped into the catcher by the reel is allowed to escape through the screen, but the holes in the screen are sufficiently small to prevent the escape of grass clippings. In practice, however, such screens or meshes tend to become clogged with grass after a period of time and the catcher in effect reverts to a completely closed catcher.

Presumably because of problems associated with screened (but otherwise closed) catchers, attempts were made to make a more or less closed catcher having rather large slots or the like which would not tend to clog up but would allow air to freely escape the catcher. An example of this type of catcher is shown in U.S. Pat. No. 4,080,774 issued to R. G. Knight. In the Knight catcher, a large slot is formed between the forward edge of one wall of the catcher and the rear edge of a deflector plate attached to the mower. While this type of slotted (but otherwise closed) catcher is adequate in some conditions, e.g., heavy or wet grass, it is not particularly efficient when the grass clippings are quite small and dry due to the fact that a certain amount of the air/grass stream can jet more or less directly through the slot formed at the top of the catcher. Also, the Knight catcher appears to be symmetrical with respect to the longitudinal centerline of the mower, and therefore the grass would tend to pile up on the side of the catcher favored by the cutting reel. A simple slotted catcher like that shown in Knight would, however, be quite cost effective and simple to manufacture.

A slotted catcher which seemingly addresses some of the problems associated with the simple slotted Knight-type catcher is disclosed in U.S Pat. No. 3,521,436, issued to E. G. Venzke. The Venzke catcher could be categorized as a "slotted closed catcher" in spite of the fact that it has a rather large mouth or inlet opening. The Venzke catcher has an upwardly facing exhaust opening which supposedly allows air to escape while at the same time containing the grass clippings. The exhaust opening includes a fairly narrow throat and a diverging portion so as to, in theory, slow down the air to the point that the grass particles fall back into the catcher. The Venzke catcher also includes a screen which extends across the full width of the exhaust opening which itself extends across the whole width of the upper portion of the catcher.

Although the Venzke catcher may represent an advance over the simple slotted Knight-type catcher, in fact the Venzke-type catcher is disadvantageous in several respects. For one thing, the Venzke catcher, being rather open at its mouth and exhaust opening and lacking flow baffles, would not create a tortuous enough flow path to dissipate air flow energy sufficiently to allow grass particles to separate out. Also because of the symmetrical design of the Venzke catcher with respect to the longitudinal centerline of the catcher and the mower e.g.. the full width exhaust opening, the grass will naturally tend to pile up on the side favored by the rotating reel. That is, Venzke simply hasn't accounted for the way the grass/air stream exits the reel at an angle. And, the Venzke-type catcher includes a screen which may tend to clog under some circumstances, and, even if clogging is avoided by using rather large openings in the screen, the screen obviously contributes to greater expense and user inconvenience.

The present invention is a slotted (but otherwise closed) catcher which addresses the problems associated with prior art reel mower grass catchers. Applicants have devised a novel way to separate grass clippings from the air stream thrown off a rotating reel by reducing the kinetic energy of the air/grass stream being "pumped" by the reel. Applicants' catcher creates enough turbulence to dissipate the kinetic energy of the air/grass mixture sufficiently to allow the grass (including even the smallest and driest of grass clippings) to fall out of the air stream and into the catcher. Furthermore, Applicants' catcher is designed to force the "captured" grass clippings to uniformly cover the bottom of the basket.

SUMMARY OF THE INVENTION

Accordingly, the invention pertains to a grass catcher suitable for use with a reel mower. The grass catcher includes first and second sides wherein the blades of the mower reel angle toward the catcher first side. The catcher includes a substantially hollow body: mouth means for allowing the ingress of the air/grass stream produced by the rotating reel into the catcher body; and vent means for allowing the egress of air from within the catcher body to the atmosphere. The vent means is closer to the catcher second side than the catcher first side, whereby better grass separation is achieved and the grass which is captured within the catcher is more evenly distributed across the entire bottom wall thereof.

Stated another way, the vent means is configured such that more of its "effective open area" is on or proximate the second side of the catcher than the first side of the catcher.

The "vent means" referred to above preferably includes partitions which extend into the catcher hollow body, each partition having an outer end and an inner end (or an upper end and a lower end for a vent located at the top of the catcher). A "slot means" is formed proximate the inner (lower) ends of the partitions to allow the egress of air from within the catcher hollow body.

The "slot means" preferably includes a pair of slots, with a bar located adjacent the inner ends of the partitions forming the slots in conjunction with the partition inner ends.

Preferably about two-thirds of the vent means is located proximate the second side of the catcher, although this degree of offset may change depending on the parameters of the mower, e.g., reel speed, number of blades, etc.

The "vent means" is preferably in the form of a substantially rectangular vent which extends transversely across a good portion of the entire width of the catcher.

The "mouth means" of the catcher preferably includes a panel facing the mower reel, wherein the panel prevents the backflow of air and grass through the mouth of the catcher.

DESCRIPTION OF A PREFERRED EMBODIMENT

Figure 1:
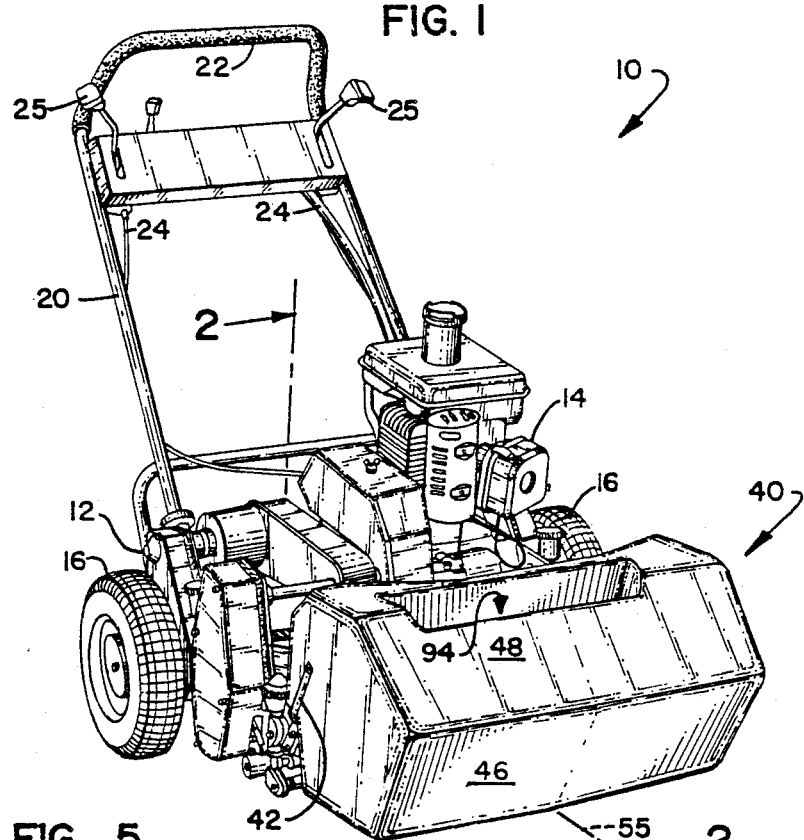
FIG. 1 is a perspective view of a suitable greensmower equipped with a grass catcher made in accordance with of the invention.

A preferred embodiment of the invention will now be described with reference to the drawings, wherein like reference numerals designate like parts and assemblies throughout the several views. FIG. 1 perspectively shows a mower 10 of the type capable of being used on a golf green. The mower 10 includes a frame 12 on which is disposed a suitable prime mover or engine 14 operatively driving a pair of drive wheels 16 engaging a ground surface. A handle 20 having a crossbar 22 is operatively connected to the frame 12 and carries one or more control wires 24 leading to control levers 25 located on or near the crossbar 22 so that an individual may control the operation of the mower 10 in a known manner.

Figure 2:
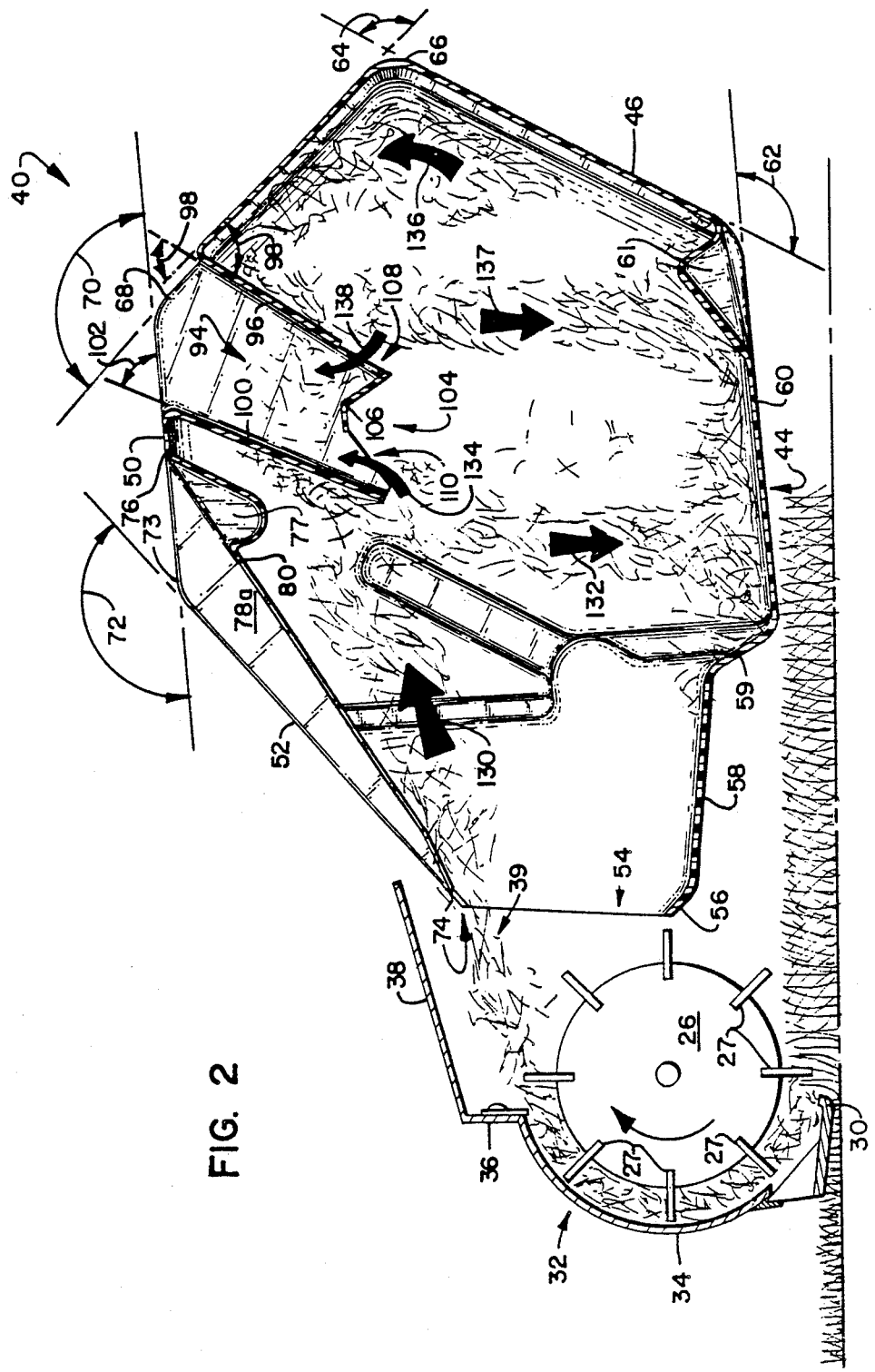
FIG. 2 is a partial, somewhat schematic view of the greensmower shown in FIG. 1, and a transverse sectional view of the grass catcher of FIG. 1, taken generally along line 2—2 thereof.

A cutting reel 26 (see FIG. 2) is carried by the frame 12 for rotation about an axis transverse to the direction of travel of the mower 10 and is drivably rotated by suitable power transmission means (not shown) connected to the engine 14. The cutting reel 26 includes a plurality of helical blades 27 rotating in a clockwise direction as viewed in FIG. 2. A stationary bedknife 30 is mounted to frame 12 of mower 10, and bedknife 30 and blades 27 act in conjunction to shear the grass as mower 10 is propelled forwardly (to the right in FIG. 2). A shield 32 is also mounted to frame 12 and includes a curved member 34 which encompasses substantially the entire rear half of reel 26. Curved member 34 terminates at its lower end at or near bedknife 30, and at its upper end at a short offset portion 36 which extends substantially vertically. Attached to the uppermost end of offset portion 36 is a substantially planar member 38 which extends slightly upward but is basically horizontal. Member 38 can be slightly curved and is not necessarily entirely flat or planar as shown in FIG. 2. Bedknife 30 and shield 32 extend substantially across the entire width of cutting reel 26. In operation, reel 26 and bedknife 30 act in conjunction to shear the grass at their interface and the grass clippings are propelled upwardly around the concave inner surface of curved member 34 and ultimately discharged from the reel roughly at the offset portion 36 of shield 32. Reel 26, which can rotate at speeds up to about 2300 RPM, propels more than grass however. Large amounts of air are also "pumped" by reel 26 so that in effect reel 26 and shield 32 combine to form a grass/air pump which creates a strong grass/air stream 39 directed forwardly. The individual grass clippings are represented in FIG. 2 by short, randomly-oriented lines.

The grass/air stream 39 being thrown off reel 26 is directed into a catcher 40 mounted by any convenient means on frame 12 of mower 10. Preferably, catcher 40 is grooved to accept a pair of "horns" 42 which angle upwardly from frame 12 (see FIG. 1). Horns 42 support catcher 40 in such a way that when it becomes filled with clippings, it can easily be removed and the clippings dumped therefrom.

Figure 5:
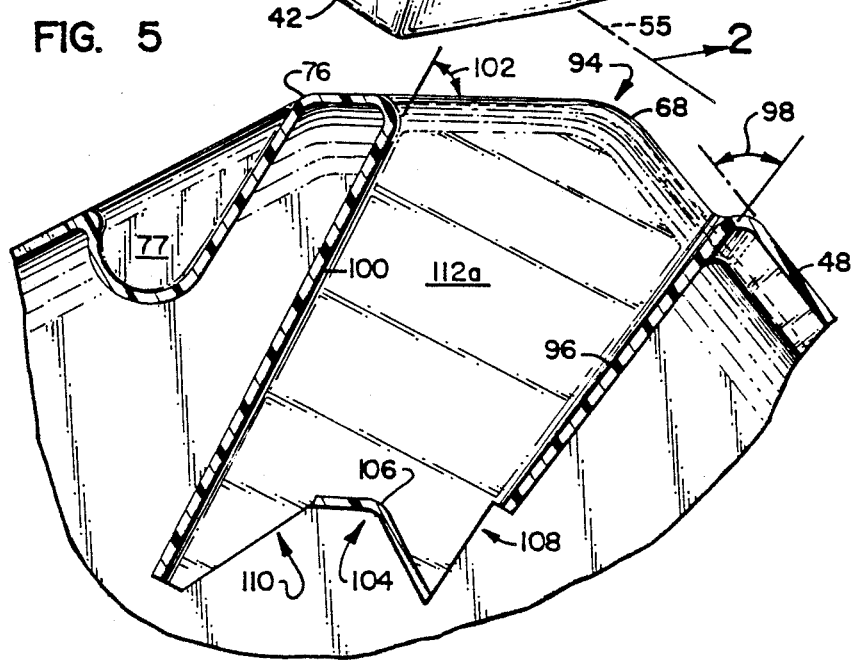
FIG. 5 is an enlarged view of a portion of the transverse sectional view of FIG. 2.

The preferred configuration of catcher 40 is front-mounted as shown in the drawings. Referring to FIG. 2, catcher 40 preferably consists of a hollow body having, broadly speaking, five transverse surfaces, a bottom wall 44, a forward lower wall 46, a forward upper wall 48, a top wall 50, and a rearward upper wall 52, the walls combining to form a rearwardly open mouth 54. These major surfaces extend transversely across the entire width of catcher 40 and are symmetrically disposed about a vertical plane containing longitudinal centerline 55 (see FIGS. 3, 4 and 5), although one aperture formed in and between walls 48 and 50 and discussed at length below is decidedly asymmetrical with respect to longitudinal axis 55. Laterally-spaced side walls 140 complete catcher 40. See FIGS. 3 and 4. Preferably catcher 40 is molded of suitable plastic material and is a relatively lightweight one-piece member. A preferred method of molding catcher 40 is rotomolding, and a preferred material for catcher 40 is polyethylene.

The rearmost edge of bottom wall 44 preferably forms an upturned lip 56 which helps retain the clippings within catcher 40. Lip 56 is connected at its lower, forward end to a planar, nearly horizontal rear shelf 58 which covers roughly 40% of bottom wall 44. The forwardmost edge of rear shelf 58 transitions downwardly through a short nearly vertical midwall 59 to a planar, nearly horizontal forward shelf 60 which covers roughly 60% of bottom wall 44. A handhold 61 is formed at the forwardmost end of forward shelf 60.

Forward lower wall 46 forms an angle 62 with forward shelf 60 of about 120°; and forward upper. Wall 48 forms an angle 64 With forward lower wall 46 of about 108°. Walls 46 and 48 join at a forward edge 66 which constitutes the leading edge of catcher 40, walls 46 and 48 are roughly the same length or height, making edge 66 lie roughly in the imaginary midplane of catcher 40 (assuming forward shelf 60 is horizontal).

Similarly, forward upper wall 48 joins top wall 50 in a crown 68 with an angle 70 of about 130° formed between walls 48 and 50 Top wall 50 is thus roughly parallel to forward shelf 60, and in fact is disposed thereabove. The uppermost end of rearward upper wall 52 forms and angle 72 at a corner 73 of about 143° with top wall 50, whereas the lowermost edge of wall 52 terminates in a corner 74 which represents the rearmost upper extent of catcher mouth 54.

Figure 3:
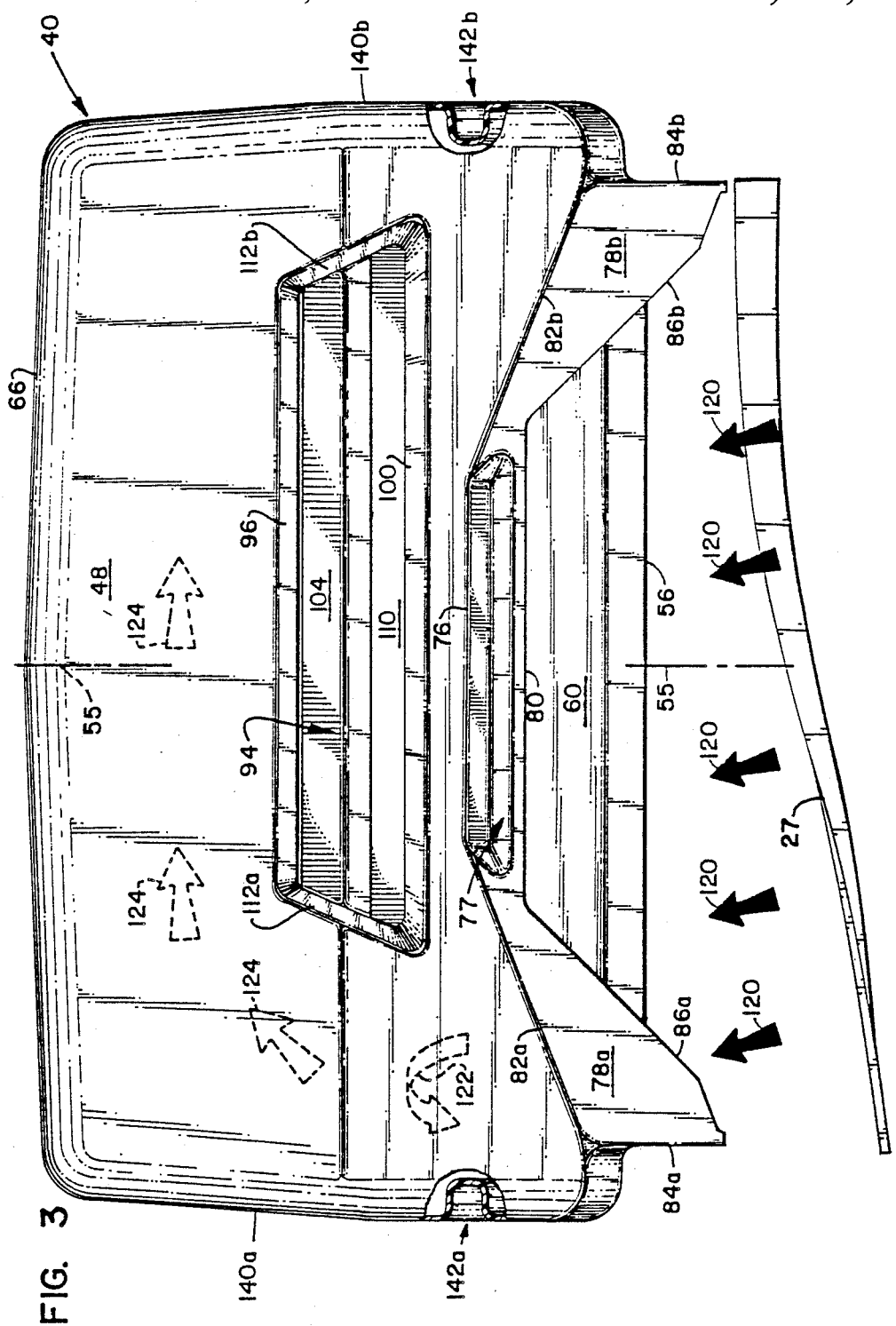
FIG. 3 is a top plan view of the grass catcher of FIG. 1.

Top wall 50 actually forms, roughly at its midline, another edge 76, although edge 76, as shown in FIG. 3, extends over only the central portion of top wall 50. Each lateral corner of edge 76 combines with corresponding corners 73 and 74 to form a substantially triangular oblique panel 78 which angles downward and inward toward bottom wall 44. The left triangular panel 78 referring to FIG. 3, is designated 78a, whereas the right panel 78, a mirror image of left panel 78a, is designated 78b. Triangular panels 78 give mouth 54 a rather complex shape: it is substantially rectangular toward its bottom but is trapezoidal at the top with the top and bottom edges of the trapezoid being parallel and the tapered sides of the trapezoidal openings being formed by the inner edges of panels 78. Edge 80, shown in FIG. 2 is the upper extent of mouth 54.

Figure 4:
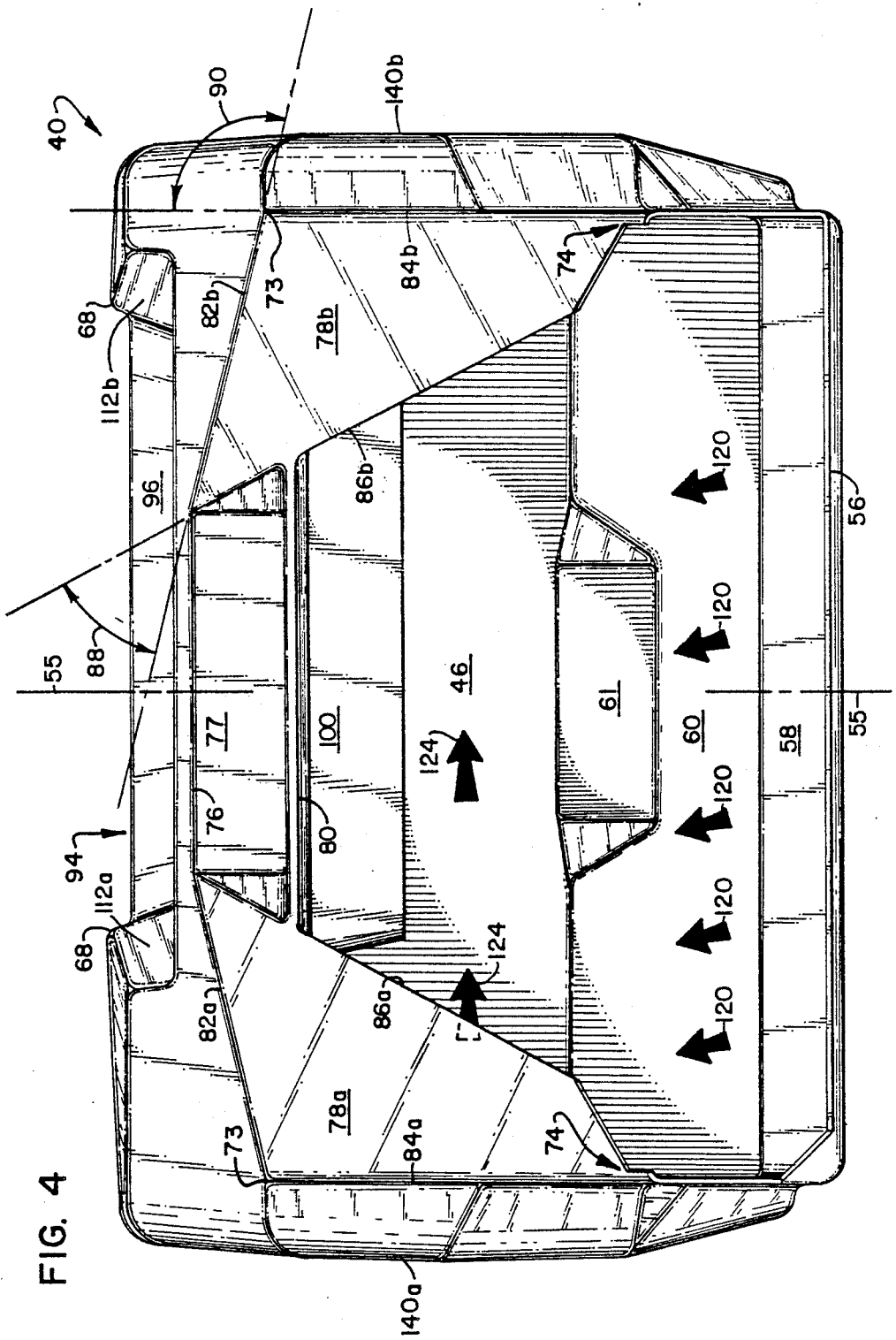
FIG. 4 is a rear elevational view of the grass catcher of FIG. 1.

Referring to FIG. 4, panels 78 are symmetrically disposed about catcher centerline 55. They each have an upper side 82, an outer side 84, and an inner side 86. These sides carry the descriptors "a" and "b" to indicate whether they are associated with panels 78a or 78b. An angle 88 of about 50° is formed between corresponding sides 82 and 86; and an angle 90 of about 102° is formed between corresponding sides 82 and 84. As noted above panels 78a and 78b are preferably mirror images of one another, symmetrical about an imaginary vertical plane containing centerline 55. It should be noted that FIG. 4 is an elevational view of catcher 40 and panels 78 angle obliquely inwardly toward bottom wall 44. Therefore, the true measure of angles 88 and 90 is not precisely as shown in FIG. 4 (or FIG. 3) or as described above. However, those skilled in the art will recognize that the precise angular orientation of panels 78 and the precise values for angles 88 and 90 are not critical but can be adjusted to accommodate various types of mowers having various flow characteristics.

As noted above, catcher 40 is preferably symmetrical about longitudinal axis 55 with the exception of an aperture formed proximate the intersection of walls 48 and 50, toward the very top of catcher 40. This aperture is a transverse, roughly rectangular vent 94 which is indeed offset relative to axis 55, roughly two-thirds of vent 94 being located to the right of axis 55 (as viewed in FIG. 4). Vent 94 is not a simple slot in the preferred embodiment. Preferably, vent 94 is formed at its forward extent by a downwardly directed partition 96 which forms an angle 98 of roughly 77° with forward upper wall 48. Similarly, the rearmost edge of vent 94 is defined by a downwardly directed partition 100 which forms an angle 102 with top wall 50 of about 63°. Thus, partitions 96 and 100 are substantially parallel to one another in the preferred embodiment. Adjacent the bottom edges of partitions 96 and 100 at the bottom of vent 94, is a bar 104 which extends across the whole width of vent 94. Bar 104 is roughly in the nature of an inverted "V", in section, with the apex of bar 104 being designated 106 in FIG. 2. Bar 104 is spaced from the lower ends of partitions 96 and 100 so as to form slots 108 and 110, respectively, which allow air to escape from the interior of catcher 40. The transversely-spaced outer walls of vent 94 are formed by walls 112a and 112b, shown in FIGS. 3 and 4.

Partitions 96 and 100 are preferably about 3.75 and 5.25 inches long, respectively, making vent 94 roughly about 4.5 inches in height. Slot 108 is nearly vertical whereas slot 110 is nearly horizontal in the preferred embodiment. Slots 108 and 110 are about 1.25 and 1.50 inches across respectively, and about 15 inches long. At lower reel speeds it may be desirable to make slots 108 and 110 smaller. Likewise for higher reel speeds it may be desirable to make slots 108 and 110 larger. Another parameter of interest is the degree to which vent 94 is offset relative to longitudinal axis 55. Preferably about 60% to 80% of vent 94 is to the right of longitudinal axis 55. Applicants have discovered that the most preferred degree of offset is about 60% to the right of axis 55, but that will depend to a large extent on the mower to which the catcher is attached. The preferred dimensions for slots 108 and 110 given above are based on an eleven bladed reel rotating at about 1350 to 2100 RPM creating clip lengths of about 0.16 to 0.24 inch, or even longer if the grass being mowed is quite long. If any of these parameters change the precise dimensions and/or orientations of slots 108 and 110 may need to be adjusted.

Finally FIG. 3 illustrates grooves 142 formed in side walls 140. Grooves 142 are shaped so as to receive horns 42 which extend upwardly from mower frame 12.

OPERATION

The operation of catcher 40 can now be explained. Referring to FIG. 2, as reel 26 rotates in a clockwise direction grass is sheared at the interface between spiral blades 27 and bedknife 30. Grass particles are then propelled around the concave inner surface of curved member 34 and ultimately toward and into catcher 40. A grass/air stream 39 issues off of blades 27 roughly as shown in FIG. 2. It should be noted that FIG. 2 is only a rough pictorial illustration of what actually transpires within catcher 40 during operation. Applicants theorize that there are many cross currents and counter currents which generate a terrific amount of turbulence, causing grass clippings to fly about every which way. Rather discrete grass/air streams are shown in the drawings to make it easier to explain Applicants' theory as to how catcher 40 operates so efficiently.

Referring to FIGS. 3 and 4, arrows 120 represent the grass/air stream issuing off of blades 27 of reel 26. It should particularly be noted that arrows 120 form an angle relative to longitudinal axis 55. Applicants are unaware of the precise angle, but it is known that the angle formed between arrows 120 and axis 55 is largely determined by the angle of the spiral blades relative to the reel axis. A representative reel blade 27 is shown in FIG. 3. It is clear that blades 27 angle toward and favor the left side of catcher 40 and indeed grass would tend to pile up in the left side of catcher 40 were it not for certain structural features which tend to uniformly distribute the grass over the entire bottom wall 44 of catcher 40.

Referring in particular to FIG. 3, when the grass/air streams enter catcher 40 a portion of them will try to escape at the left edge of catcher 40 near panel 78a simply because of the skewed manner in which the grass/air streams represented by arrow 122 in FIG. 3, which is directed toward the underside of panel 78a. Panel 78a, however, substantially prevents the escape of any of the grass. Arrows 124, also shown in FIG. 3, pictorially represent what happens to at least some of the grass and air when they encounter the closed left portion of catcher 40 (as viewed in FIG. 3). Arrows 124 can also be seen in FIG. 4. Since a good portion of the grass and air are directed left to right within catcher 40, a more even distribution of grass within catcher 40 results in spite of the fact that the grass leaves reel 26 with a right to left tendency.

A more uniform distribution of grass within catcher 40 is also significantly enhanced by the offset nature of vent 94 relative to longitudinal catcher axis 55. If vent 94 was symmetrically disposed relative to axis 55 the grass/air streams would tend to jet out of the left side of vent 94 as viewed in FIG. 3 and 4. If vent 94 extended much further to the left, the air would have enough kinetic energy to carry the grass completely out of catcher 40 and onto the surface being mowed. Thus, panel 78a and offset vent 94 work in combination to result in a particularly uniform distribution of grass within catcher 40. However, clearly, either element individually would also contribute to a more even distribution of grass within catcher 40: panel 78a prevents the escape of grass from the left side of mouth 54 and offset vent 94 is positioned to substantially prevent the escape of grass through its left side.

Referring to FIG. 2 a good portion of grass/air stream 39 is thrown directly against the rear surface of partition 100. This phenomenon is illustrated by flow arrow 130 pointed directly toward partition 100. When the grass/air stream 39 strikes partition 100 much of the kinetic energy of the stream is dissipated and the grass tends to fall downward onto bottom wall 44 as represented by downwardly-directed arrow 132. At the same time relatively low velocity air is allowed to escape through slot 110, as represented by flow arrow 134. Any residual grass carried up through slot 110 will tend to only partially ascend vent 94 and eventually fall onto bar 104 and back into the main body of catcher 40. Bar 104 is peaked to allow it to shed the falling grass. The fact that most of the residual grass fails to completely ascend slot 94 is due at least in part to a diverging and slowing of the air flow as it passes into the relatively large vent 94.

Applicants have discovered, however, that not all of the grass impacts partition 100. They have found that a portion of the grass is directed upwardly by walls 46 and 48 and eventually strikes the front side of partition 96, as represented by flow arrow 136 in FIG. 2. This causes, as described above with reference to the rear slot 110, much of the grass to fall to bottom wall 44, as represented by flow arrow 137 and much of the lower velocity air to pass through front slot 108 and eventually to escape through vent 94 to the atmosphere. Again, residual grass, which manages to escape through slot 108, normally cannot make it all the way to the top of vent 94, and eventually falls onto bar 104 and eventually back through slot 108 or 110 and into the main body of catcher 40.

Of course, Applicants do not know precisely the path of each grass particle which is thrown into catcher 40 during operation. The above discussion and the drawings illustrate Applicants' theory as to how catcher 40 operates, based on their observations and their knowledge of fluid flow mechanics, but it is possible that other aspects of catcher 40 contribute to its efficient operation. It should also be noted that the cross flow phenomenon shown in FIGS. 3 and 4, wherein air and grass are directed from left to right because of panel 78a in combination with vent 94, operates simultaneously with the tortuous path grass separation process shown in FIG. 2. These processes act in combination to dissipate a considerable amount of the kinetic energy of the air pumped by high speed reel 26. Once the air velocity is sufficiently diminished even very small, dry grass clippings can fall out of the air stream and collect on the bottom wall 44 of catcher 40. The clean air is then allowed to escape through slots 108 and 110, up through vent 94 and out to the atmosphere. The efficient grass separation process which takes place within catcher 40 could also be likened to a centrifugal process. The air is not permitted to jet directly through slots 108 and 110, but must instead make rather sudden turns to do so. i.e., follow a tortuous path. When this occurs, the grass particles, being heavier than air, may fail to successfully negotiate the turn and impact one of the partitions 108 or 110 or bar 104 and fall to the bottom floor 44 of catcher 40.

Another interesting feature of catcher 40 is that when it becomes nearly full the grass/air streams 39 will jet more or less directly through slots los and 110. It is thought that this phenomenon occurs because progressively less of the kinetic energy of the air is dissipated as the top of the pile of grass accumulating on bottom wall 44 nears slots 108 and 110. In any event, when the pile gets quite close to slots 108 and 110 a very noticeable amount of grass begins to spew out from the top of vent 94 and the operator immediately knows that it is time to empty catcher 40.

There are other modifications which will be apparent to those skilled in the art. For example, vent 94 could consist of a series of holes, round or otherwise, which may even vary in size and/or spacing to in effect create the flow equivalent of the slots 108 and 110. Or, slots 108 and 110 could be replaced by one slot or three slots or any number of slots, so long as they create, in effect, an offset vent. Accordingly, the scope of this invention will be limited only by the appended claims.

We claim:

1. A grass catcher having first and second sides suitable for use with a reel mower having a reel capable of creating an air/grass stream with blades which angle toward the catcher first side, the catcher comprising:
   (a) a substantially hollow body;
   (b) mouth means for allowing the ingress of the air/grass stream into the catcher body; and
   (c) vent means having an effective open area for allowing the egress of air from within the catcher body to the atmosphere, wherein more of the effective open area of the vent means is on the second side of the catcher than the first side of the catcher, and wherein the vent means comprises a vent comprising partitions which extend into the catcher hollow body, each partition having an outer end and an inner end, wherein a slot means is formed proximate the inner ends of the partitions to allow the egress of air from within the catcher hollow body.

2. The grass catcher of claim 1, wherein the slot means comprises a plurality of slots.

3. The grass catcher of claim 1, wherein the slot means comprises a pair of slots.

4. The grass catcher of claim 1, wherein the slot means comprises a pair of slots located on either side of a bar which extends across the vent proximate the inner ends of the partitions.

5. The grass catcher of claim 1, wherein the vent is formed by a rear partition, a front partition and a pair of vent side walls, wherein the partitions extend toward the interior of the catcher body in substantially parallel fashion.

6. The grass catcher of claim 5, wherein the partitions are between about 3.5 and 5.5 inches in length.

7. The grass catcher of claim 5, wherein the vent means is substantially rectangular in shape.

8. A grass catcher having first and second sides suitable for use with a reel mower having a reel which creates an air/grass stream directed more toward the catcher first side than the catcher second side, the catcher comprising:
   (a) a substantially hollow body;
   (b) mouth means for allowing the ingress of the air/grass stream into the catcher body; and (c) vent means for allowing the egress of air from within the catcher body to the atmosphere, wherein the vent means is closer to the catcher second side than the catcher first side, and wherein about 60% to 80% of the vent means is located proximate the second side of the catcher.

9. A grass catcher having first and second sides suitable for use with ar eel mower having a reel which creates an air/grass stream directed more toward the catcher first side than the catcher second side, the catcher comprising:
   (a) a substantially hollow body;
   (b) mouth means for allowing the ingress of the air/grass stream into the catcher body; and
   (c) vent means for allowing the egress of air from within the catcher body to the atmosphere, wherein the vent means is closer to the catcher second side than the catcher first side,
   and wherein about 60% of the vent means is located proximate the second side of the catcher.

10. A grass catcher having first and second sides suitable for use with a reel mower having a reel capable of creating an air/grass stream with blades which angle toward the catcher first side, the catcher comprising:
    (a) a substantially hollow body;
    (b) mouth means for allowing the ingress of the air/grass stream into the catcher body; and
    (c) vent means for allowing the egress of air from within the catcher body to the atmosphere, wherein the vent means is closer to the catcher second side than the catcher first side;
    wherein the vent means comprises a vent toward the top of the catcher; wherein the vent comprises partitions which extend downwardly into the hollow body of the catcher; and wherein slot means for allowing the egress of air from within the hollow body for the catcher is formed proximate the bottom of the partitions.

11. A grass catcher having first and second sides suitable for use with a reel mower having a reel capable of creating an air/grass stream with blades which angle toward the catcher first side, the catcher comprising:
    (a) a substantially hollow body;
    (b) mouth means for allowing the ingress of the air/grass stream into the catcher boy; and
    (c) vent means for allowing the egress of air form within the catcher body to the atmosphere, wherein the vent means is closer to the catcher second side than the catcher first side,
    wherein the mouth means is formed in part by a panel which faces the reel, and wherein the panel is located on the first side of the catcher and substantially prevents the escape of air and grass from within the hollow body of the catcher back out through the mouth means.

12. The catcher of claim 11, wherein the panel is substantially triangular.

13. A grass catcher having first and second sides suitable for use with a reel mower having a reel capable of creating an air/grass stream with blades which angle toward the catcher first side, the catcher comprising;
    (a) a substantially hollow body;
    (b) mouth means for allowing the ingress of the air/grass stream into the catcher body; and
    vent means for allowing the egress of air from within the catcher body to the atmosphere, wherein the vent means is closer to the catcher second side than the catcher first side,
    and wherein when the catcher becomes full the vent means allows a substantial amount of grass and air to exhaust from the interior of the hollow body, whereby the operator can tell when it is time to empty the catcher.

14. A grass catcher for a reel mower capable of creating an air/grass stream, the catcher comprising:
    (a) a substantially hollow body having a longitudinal axis and first and second sides laterally disposed thereabout:
    (b) a mouth formed in part by a pair of triangular panels which change the otherwise rectangular mouth into one having a substantially rectangular lower portion and a substantially trapezoidal upper portion, the mouth allowing the ingress of the air/grass stream into the catcher body; and
    (c) a vent for allowing the egress of air from within the catcher body to the atmosphere, the vent being formed by front and rear rectangular partitions which extend from the top of the catcher downwardly into the hollow body of the catcher a distance of about four to five inches, and a bar spanning the full width of the vent located proximate the bottom edges of the partitions, wherein the partitions and the bar form a pair of slots for allowing the egress of air from within the catcher body, and wherein about 60% of the vent is located proximate the second side of the catcher body.

15. A grass catcher for a reel mower capable of creating an air/grass stream, the catcher comprising:
    (a) a substantially hollow body:
    (b) a mouth for allowing the ingress of the air/grass stream into the catcher body; and
    (c) a vent located at the top of the catcher body for allowing the egress of air from the interior of the catcher body; wherein the vent is formed by a front substantially rectangular partition and a rear substantially rectangular partition; wherein the partitions extend into the catcher sufficiently to prevent the direct jetting out of the air/grass stream from the catcher body.

16. A grass mowing and catching machine having a normal direction of travel, comprising:
    (a) a reel mower having a reel capable of creating an air/grass stream, wherein the reel comprises a blade having a blade width perpendicular to the normal direction of travel of the mowing and catching machine; and
    (b) a catcher operatively connected to the reel mower comprising:
        (i) a substantially hollow body having first and second sides, wherein the air/grass stream is directed toward the first side of the catcher body;
        (ii) a mouth for allowing the ingress of the air/grass stream into the catcher body, the mouth having a mouth width perpendicular to the normal direction of travel of the mowing and catching machine; and
        (iii) a vent having an effective open area for allowing the egress of air from within the catcher body to the atmosphere, wherein more of the effective open area of the vent is proximate the second side of the catcher body than the first side of the catcher body, and wherein the width of the catcher mouth is approximately equal to the width of the reel.

17. The grass mowing and catching machine of claim 16, wherein the mouth of the catcher extends substantially from the first side of the catcher body to the second side of the catcher body.

18. The grass mowing and catching machine of claim 16, wherein the catcher is mounted to the front of the mower and the catcher body is formed by a plurality of transverse surfaces extending from the first side of the body to the second side of the body, the transverse surfaces combining to form and dispose the mouth such that it is proximate to and just forward of the reel, wherein the mouth extends substantially from the first side of the catcher to the second side of the catcher.

19. The grass mowing and catching machine of claim 16, wherein the catcher has a longitudinal axis parallel to the normal direction of travel, and wherein the mouth is substantially symmetrical with respect to the catcher longitudinal axis and the vent is offset with respect to the catcher longitudinal axis toward the second side of the catcher.

20. The grass mowing and catching machine of claim 16, wherein the vent extends over more than about one-half the distance between the catcher body first and second sides.

21. The grass mowing and catching machine of claim 16, wherein the vent is formed by a rear partition, a front partition and a pair of vent side walls, wherein the partitions extend toward the interior of the catcher body in substantially parallel fashion.

22. The grass mowing and catching machine of claim 16, wherein the mouth is formed in part by a panel which faces the reel, wherein the panel is located on the first side of the catcher and substantially prevents the escape of air and grass from within the hollow body of the catcher back out through the mouth.

23. The grass mowing and catching machine of claim 22, wherein the panel is substantially triangular.

24. A grass catcher having first and second sides suitable for use with a reel mower having a reel capable of creating an air/grass stream with blades which angle toward the catcher first side, the catcher comprising:
  (a) a substantially hollow body comprising a panel located on the first side of the catcher proximate the reel;
  (b) mouth means for allowing the ingress of the air/grass stream into the catcher body, wherein the mouth means is formed in part by the panel, wherein the panel substantially prevents the escape of air and grass from within the hollow body of the catcher back out through the mouth means; and
  (c) vent means having an effective open area for allowing the egress of air from within the catcher body to the atmosphere, wherein the vent means comprises a vent having front and rear partitions which extends into the catcher hollow body, each partition having an outer end and an inner end, wherein a slot means is formed proximate the inner ends of the partitions to allow the egress of air from within the catcher hollow body.

* * * * *